United States Patent [19]

Kushida et al.

[11] Patent Number: 4,483,511
[45] Date of Patent: Nov. 20, 1984

[54] VALVE ASSEMBLY INCLUDING ELASTIC SEALS

[75] Inventors: Kazuhiko Kushida; Ryoji Suyama, both of Saitama, Japan

[73] Assignee: Kitamura Valve Mfg. Co., Ltd., Tokyo, Japan

[21] Appl. No.: 532,398

[22] Filed: Sep. 15, 1983

[30] Foreign Application Priority Data

May 18, 1983 [JP] Japan ................................ 58-85698

[51] Int. Cl.³ .............................................. F16K 25/00
[52] U.S. Cl. .................................. 251/174; 251/172; 267/155; 267/165
[58] Field of Search ................ 251/174, 172; 267/155, 267/164, 165

[56] References Cited

U.S. PATENT DOCUMENTS 3,233,862  2/1966  Marsh .............................. 251/174 X
3,472,270  10/1969  Masheder ........................ 251/174 X
4,217,923  8/1980  Kindersley ....................... 251/174 X

FOREIGN PATENT DOCUMENTS 707181  4/1954  United Kingdom ................ 267/155

Primary Examiner—Harold W. Weakley
Attorney, Agent, or Firm—Yuter, Rosen & Dainow

[57] ABSTRACT

A valve assembly of a trunnion type valve such as a ball valve in which a valve seat retainer having a valve seat at its one end is slidably received in a valve casing and a biasing means is provided between the other end of the valve seat retainer and an annular shoulder of the valve casing opposing the former. The biasing means is comprised of a ring and a plurality of spring elements which are kept in a circular arrangement by the connecting ring and each have a substantially U-shaped profile for biasing the two end surfaces of the valve casing and the valve seat retainer. Since the biasing means is simple and can be readily adapted to valves of different sizes, it offers a great advantage in use. Furthermore, the manufacture of the biasing means is simple and causes almost no material loss in the manufacturing process.

17 Claims, 27 Drawing Figures

VALVE ASSEMBLY INCLUDING ELASTIC SEALS

This invention relates to a valve assembly and in particular to a valve assembly of a trunnion type including a means of biasing a valve seat toward a valve member.

Conventionally, the sealing ability of a valve has been largely dependent on the elastic property of valve seals which are typically made of rubber, teflon ® and other synthetic materials. However, due to the increasingly severe requirements imposed on such sealing materials in terms of pressure and temperature, other more enduring materials have come to be preferred as sealing materials in valves such as those using graphite as an essential ingredient, and these materials often lack sufficient resiliency for ensuring a satisfactory sealing capability by themselves. In such a case, it is preferable to use a separate means for maintaining certain pressure between the sealing member and a valve member.

To such an end, according to a known technique for a trunnion type valve such as a ball valve, a valve seat retainer is provided in a valve casing in a floating manner and an annular dish-plate spring is interposed between the valve seat retainer and the valve casing so that the valve seat retainer may be always biased toward the valve member. A sealing means is provided on a valve seat carried by the valve seat retainer so that the sealing means can maintain intimate contact with the valve member at all times under the pressure from the biasing force produced from the dish-plate spring.

However, a dish-plate spring is unsuitable for use particularly in a large-diameter valve since the range of smooth deflection is relatively small since the spring basically has non-linear characteristics. Therefore, it is difficult to determine the optimum spring properties of such dish-plate springs for use in the valves of various sizes.

The dish-plate spring may be made much more manageable by cutting a multiplicity of slits in radial directions along the inner periphery of the dish-plate spring, but such a structure is undesirable for a large spring and requires complex working processes involving substantial costs for manufacture.

Furthermore, due to its basic configuration, the material loss in the manufacturing process is considerable and it is also a disavantage that dish-plate springs of various sizes must be prepared for valves of various sizes.

Compression coil springs have basically linear characteristics and offer a greater freedom in the selection of the characteristics between the load and the resulting deflection. However, a number of blind holes must be drilled out in the valve casing for the purpose of retaining these compression coil springs, accordingly, involving a greater manufacturing cost and causing the increase in the axial dimension of the valve casing, not to mention the increase in the assembly cost for placing coil springs in the blind holes. Thus, the material cost and the assembly cost are both pushed up as a result.

In view of these shortcomings and inconveniences of the conventional structures for biasing a valve seat retainer toward a valve member in a trunnion type valve with a floating valve seat, a primary object of this invention is to provide a valve assembly with an improved valve seat biasing means which is free from the above-described shortcomings and inconveniences.

According to this invention, such an object is accomplished by providing a valve assembly including a means for biasing a valve seat in a trunnion type valve, comprising a valve casing, a valve seat retainer which is slidably disposed in the valve casing, a valve seat which is defined at one end of the valve seat retainer in a manner that is adapted to engage with a valve member in a sealing relation, and a means for biasing the valve seat toward the valve member, interposed between the other end of the valve seat retainer and an annular shoulder defined in a valve casing, wherein the biasing means is comprised of an annular composite spring including at least three spring elements each having a substantially U-shaped profile and a connecting ring which keeps the spring elements in a substantially circular arrangement.

Other objects and advantages of this invention will become apparent from the following description in which the preferred embodiments have been illustrated in conjunction with the accompanying drawings, in which:

FIG. 4b is a side view of the spring element of FIG. 4a;

FIG. 7b is a view similar to FIG. 4b showing the spring element of FIG. 7a;

FIG. 8b is a view similar to FIG. 4b showing the spring element of FIG. 8a;

FIG. 9b is a side view of the spring element of FIG. 9a.

FIG. 10b is a view similar to FIG. 4b showing the spring element of FIG. 10a;

FIG. 11b is a view similar to FIG. 4b showing the spring element of FIG. 11a;

FIG. 12b is a view similar to FIG. 4b showing the spring element of FIG. 12a;

FIG. 15b is a view similar to FIG. 4b showing the spring element of FIG. 15a;

FIG. 16b is a view similar to FIG. 4b showing the spring element of FIG. 16a;

FIG. 17b is a view similar to FIG. 4b showing the spring element of FIG. 17a.

Figure 1:
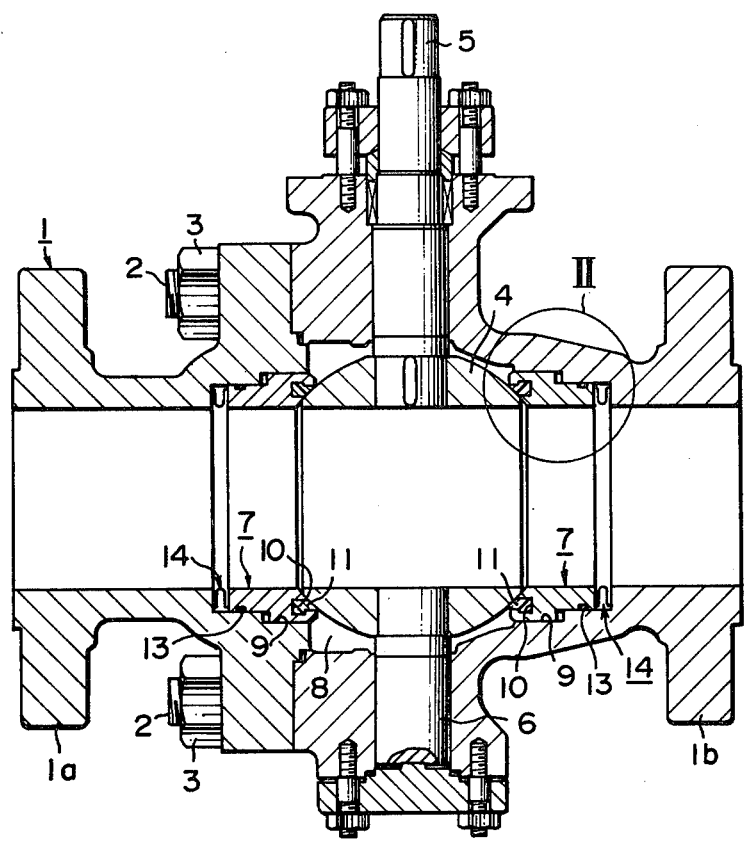
FIG. 1 is a longitudinal sectional view of a ball valve incorporated with a valve assembly according to this invention.

FIG. 1 shows a ball valve to which this invention is applied. A valve casing 1 is formed by connecting two halves 1a, 1b with bolts 2 securely fastened by nuts 3. A ball valve member 4 is rotatably mounted in the right-hand side half 1b and valve stems 5, 6 project upwardly and downwardly, respectively, from the ball valve member 4.

Numeral 7 denotes a valve seat retainer which is slidably fit into a bore 9 provided in the right-hand side half 1b of the valve casing 1. Another valve seat retainer 7 is likewise slidably fit into another bore 9 in the left-hand side half 1a of the valve casing 1. The two valve seat retainers 7 are thus disposed coaxially in the valve casing 1. Since the structure of the valve is substantially symmetrical, the following description will be limited to only half of the general structure of the ball valve.

In a surface of the valve seat retainer 7 opposing the valve member 4 is formed a first annular groove 10 in which a valve seat 11 is securely fit.

Figure 3:
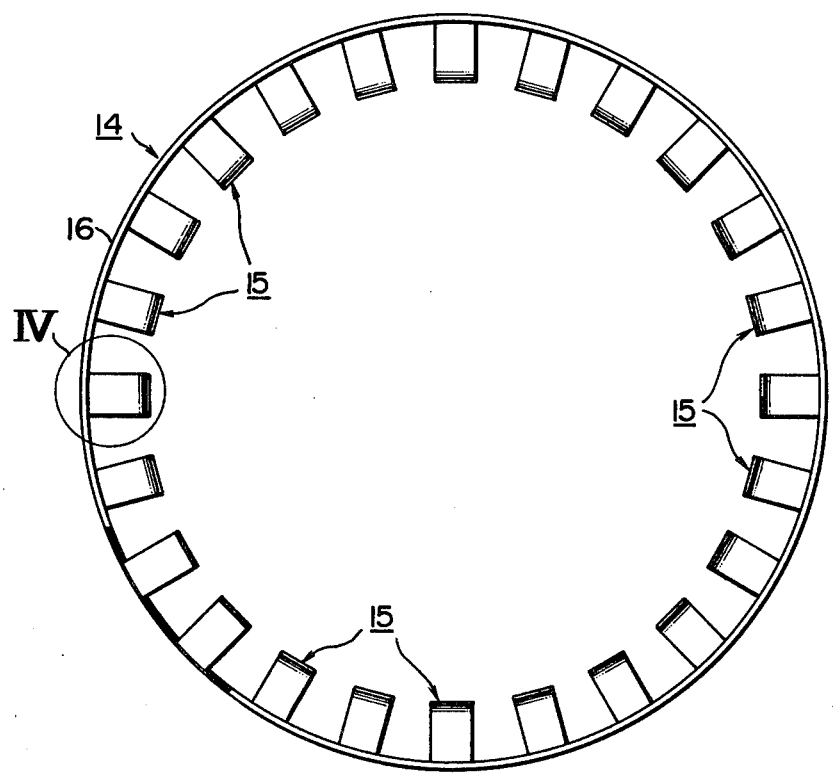
FIG. 3 is a front view of an embodiment of the annular composite spring according to this invention.

An O-ring 13 is securely received by a second annular groove 12 formed in the outer periphery of the valve seat retainer 7 while an annular spring 14 as shown in FIG. 3 is inserted in the annular cut-out between the valve seat retainer 7 and a shoulder defined in the inner periphery of the valve casing 1.

Figure 4A:
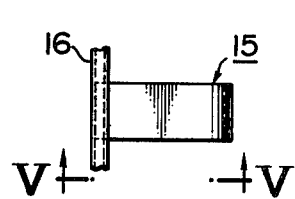
FIG. 4a is a magnified view of a part of FIG. 3 showing a spring element in detail.
Figure 4B:
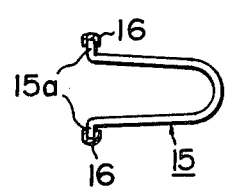

The annular spring 14 is comprised of at least three, desirably as many as possible spring elements 15 each having a U-shaped profile as shown in FIGS. 4a and 4b, connected together by a pair of connecting rings 16 in a circular arrangement.

The connecting ring 16 has a U-shaped or a trough-shaped cross-section with an axially facing open side and is produced by press forming a strip of sheet material or by flattening and press forming a wire material. The spring element 15 is comprised of a strip of sheet spring which is bent U-shaped at its middle part and provided with an outwardly directed engagement piece 15a at each end.

The annular spring 14 is formed by arranging a multiplicity of such spring elements in a circular arrangement so that the engagement pieces 15a of the spring elements 15 align on the same circle at equal intervals and securely fitting them, by adhesion of welding, into the openings of the pair of connecting rings 14 disposed in a mutually parallel relation so that their open sides oppose one another.

With the use of this annular spring 14, the spring characteristics may be freely set up by appropriately selecting the thickness, the width and the number of these spring elements 15 and the range of smooth deflection may be expanded to a sufficient extent.

And the spring element 15 may be simply made without any loss in material, by cutting a sheet material into strips or flattening a wire material and bending them with a press machine or the like. Furthermore, the assembly of the valve is simplified and the manufacturing cost of the valve may be reduced.

Figure 5:
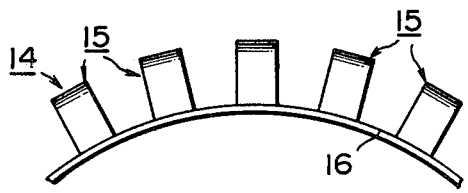
FIG. 5 is another embodiment of the annular composite spring according to this invention.
Figure 6:
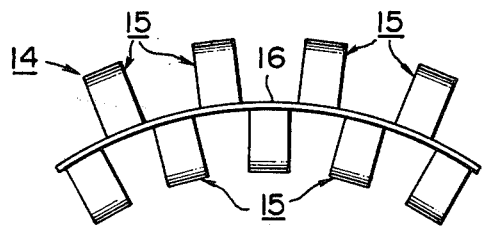
FIG. 6 is yet another embodiment of the annular composite spring according to this invention.

In the above description, the annular spring 14 was formed by arranging the spring elements 15 with the engagement pieces 15a directed in the radial outward directions and connecting them with connecting rings 14, but it is also possible either to arrange the spring elements 15 so that the engagement pieces 15a are directed in the radially inward directions and connecting them together with the connecting rings 16 as shown in FIG. 5, or to arrange the spring elements 15 so that the engagement pieces 15a are directed in the outward and inward radial directions in an alternating manner and connecting them together with connecting rings 16 as shown in FIG. 6.

Figure 7A:
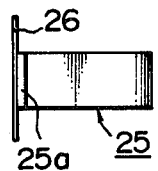
FIG. 7a is a view similar to FIG. 4a showing a different embodiment of the spring element.
Figure 7B:
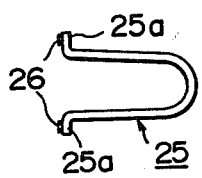

FIGS. 7a and 7b show a different embodiment of the spring element 25 in which, instead of the connecting rings 16 with a trough-shaped cross-section, a pair of connecting rings 26 each made of an annular web material are used for connecting together the spring elements 25 at outwardly projecting engagement pieces 25a formed by bending the free ends of the spring element 25.

Figure 8A:
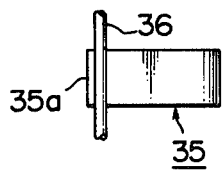
FIG. 8a is a view similar to FIG. 4a showing a different embodiment of the spring element.
Figure 8B:
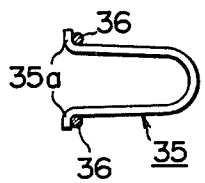

FIGS. 8a and 8b show another different embodiment of the spring element 35 in which the spring element 35 is connected together by a pair of connecting rings 36 made of a wire material at the outwardly facing corner of the outwardly bent free ends 35a of the spring element 35.

Figure 9A:
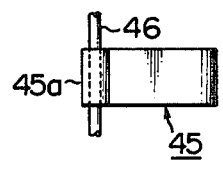
FIG. 9a is a view similar to FIG. 4a showing a different embodiment of the spring element.
Figure 9B:
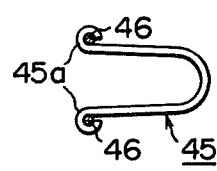

FIGS. 9a and 9b show another different embodiment of the spring element 45 in which a mounting sleeve 45a is formed at each free end of the spring element 45 for receiving a connecting ring 46 made of a wire material therein.

Figure 10A:
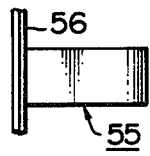
FIG. 10a is a view similar to FIG. 4a showing a different embodiment of the spring element.
Figure 10B:
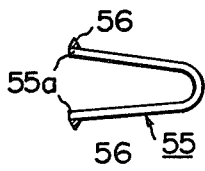

FIGS. 10a and 10b show yet another different embodiment of the spring element 55 which is substantially U-shaped and a connecting ring 56 of a triangular cross-section is attached to each free end 55a of the spring element at a flat side of the connecting ring 56.

Figure 11A:
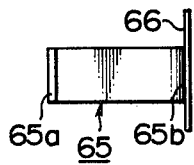
FIG. 11a is a view similar to FIG. 4a showing a different embodiment of the spring element.
Figure 11B:
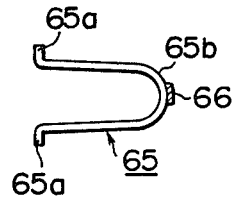

FIGS. 11a and 11b show yet another different embodiment of the spring element 65 which is U-shaped in profile and has outwardly protruding engagement pieces 65a at its free ends. A connecting ring 66 is attached to the middle part or the bent part of the spring element 65.

Figure 12A:
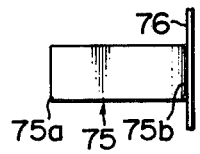
FIG. 12a is a view similar to FIG. 4a showing a different embodiment of the spring element.
Figure 12B:
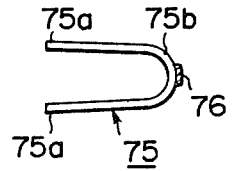

FIGS. 12a and 12b show yet another different embodiment of the spring element 75 which is similar to the embodiment described in conjunction with FIGS. 11a and 11b and is attached to a connecting ring 76 at its U-shaped bend but has no protrusion at its free ends 75a.

In the above described embodiments of the annular springs, the connecting rings were made of a wire material in the case of the embodiments described in conjunction with FIGS. 8a, 8b, 9a, 9b and were made of a web material whose radial dimensions are smaller than their axial dimensions in the case of the embodiments described in conjunction with FIGS. 7a, 7b, 11a, 11b, 12a and 12b. In the case of the embodiment described in conjunction with FIGS. 10a and 10b, the cross-section of the connecting ring 56 was triangular.

It is likewise possible with any of the above-described embodiments to arrange the spring elements all in radially outward directions, all in radially inward directions or radially inward and outward alternating directions as shown in FIGS. 3, 5 and 6. It is also possible to use a spring element which has a substantially V-shaped or any other profile as long as it can produce a spring force between two ends of the spring element.

Figure 2:
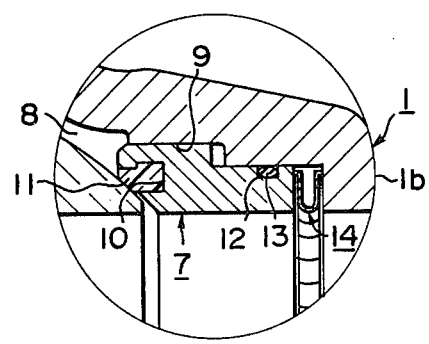
FIG. 2 is a magnified view of an essential part of FIG. 1.

The engagement pieces 15a, 25a, 35a, 65a and the mounting sleeves 46a and the connecting rings 56 with a triangular cross-section have an effect of pressing the valve casing 1 and the valve seat retainer 7 with well-defined tips of the spring elements at all times as shown in FIG. 2. This is a highly significant factor in assuring a stable biasing force to the valve seat retainer 7.

Figure 13:
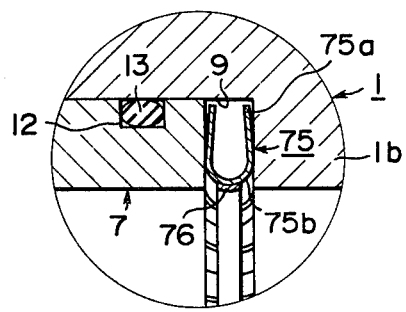
FIG. 13 is a magnified view of FIG. 2 showing an essential portion of the valve seat retainer biasing means.

As a matter of fact, if a spring element 75 is not equipped with a sideway or outward protrusion at its fee ends as shown in FIG. 13, as the spring element 75 is compressed, the point of pressure application from the spring element 75 against the valve casing 1 and the valve seat retainer 7 tends to move along the legs of the spring element 75 and its biasing force may become unstable.

Figure 14:
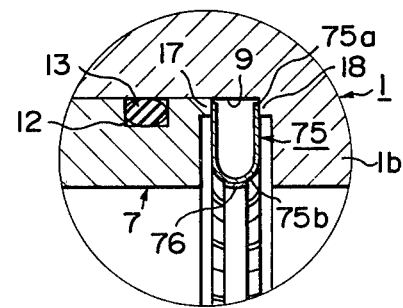
FIG. 14 is a view similar to FIG. 13 showing a different embodiment of the valve seat retainer biasing means.

In order to avoid this problem, the outer end of the valve seat retainer 7 and the portion of the end surface of the valve casing 1 opposing the free ends of the spring element 75 may be provided with annular shoulders 17, 18 as shown in FIG. 14, but there may be a risk of the free ends of the spring elements 75 coming off the annular shoulder 18, 19. The machining of these annular shoulders 18, 19 obviously means an additional step in the manufacturing process.

FIGS. 15a to 17b show various embodiments of spring elements made of a wire material.

Figure 15A:
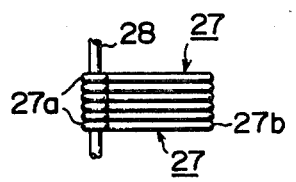
FIG. 15a is a view similar to FIG. 4a showing a different embodiment of the spring element consisting of a wire member.
Figure 15B:
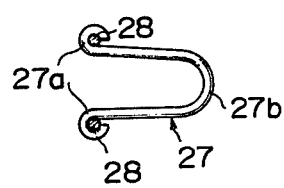

The spring element 27 shown in FIGS. 15a and 15b is comprisded of a plurality of wire materials, mutually attached in parallel relation, which are bent U-shaped at their middle parts 27b and looped into mounting rings 27a in an outwardly projecting manner at their both ends. The loops and the bend lie on the same plane.

Figure 16A:
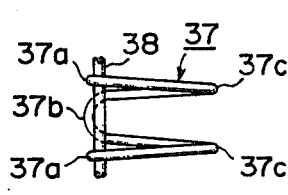
FIG. 16a is a view similar to FIG. 4a showing a different embodiment of the spring element consisting of a wire member.
Figure 16B:
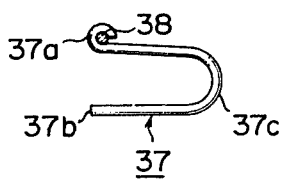

The spring element 37 shown in FIGS. 16a and 16b is comprised of a wire material which is bent U-shaped at its middle part 37b and again bent U-shaped backward at the middle parts 37c of its legs in a plane perpendicular to that of the first U-bend 37b. Each of the free ends 37a of the wire member is looped outwardly for receiving a connecting ring 38 therein. The last-mentioned loops are in the same plane as that of the second U-bends 37c.

Figure 17A:
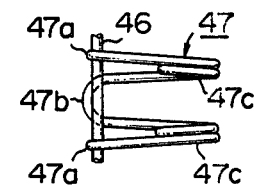
FIG. 17a is a view similar to FIG. 4a showing a different embodiment of the spring element consisting of a wire member.
Figure 17B:
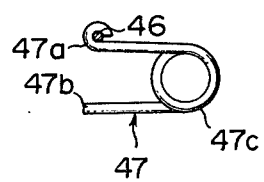

The embodiment of the spring element 47 shown in FIGS. 17a and 17b is similar to the one shown in FIGS. 16a and 16b, but has additional loops 47c at the parts of the wire material corresponding to the second U-bend. Otherwise, this embodiment is identical to the previously described embodiment in having a first U-bend 47b and loops 47a at its free ends for receiving a connecting ring 46 therein.

Due to the presence of the loops 47 in the second U-bend areas, this embodiment can offer more stable biasing force than the previously described embodiment.

Although the present invention was described in terms of specific embodiments, it is obvious to a person skilled in the art that various alterations and additions are possible without departing from the spirit of the invention which is set out in the appended claims.

What is claimed is:

1. A valve assembly including a means for biasing a valve seat in a trunnion type valve such as a ball valve, comprising:
    a valve casing;
    a valve seat retainer which is slidably disposed in the valve casing;
    a valve seat which is defined at one end of the valve seat retainer in a manner that is adapted to engage with a valve member in a sealing relation; and
    a means for biasing the valve seat toward the valve member, interposed between the other end of the valve seat retainer and a shoulder defined in the valve casing;
    wherein the biasing means is comprised of an annular composite spring including at least three spring elements each having a substantially U-shaped profile and a connecting ring which holds the spring elements in a substantially circular arrangement.

2. A valve assembly as defined in claim 1, wherein the spring element is comprised of a strip of sheet spring which is bent U-shaped.

3. A valve assembly as defined in claim 2, wherein the spring element is bent outwardly at a substantially right angle at both ends.

4. A valve assembly as defined in claim 3, wherein the connecting ring has a trough-shaped cross-section with its open end adapted to receive the outwardly bent free end of the spring element.

5. A valve assembly as defined in claim 4, wherein the spring elements are attached to the connecting ring on the outer periphery of the connecting ring.

6. A valve assembly as defined in claim 4, wherein the spring elements are attached to the connecting ring on the inner periphery of the connecting ring.

7. A valve assembly as defined in claim 4, wherein the spring elements are attached to the connecting ring in an alternating manner on the inner and the outer periphery of the connecting ring.

8. A valve assembly as defined in claim 3, wherein the connecting ring is comprised of a pair of sheet springs rings each having a rectangular cross-section with a smaller radial dimension as compared to its axial dimension and being attached to each side of the outwardly bent free ends of the sheet spring.

9. A valve assembly as defined in claim 3, wherein the connecting ring is comprised of a pair of annular rods or wires and the spring elements are attached to these annular rods or wires at outwardly facing corners in the vicinity of the outwardly bent free ends of the spring elements.

10. A valve assembly as defined in claim 2, wherein the free ends of each spring elements is looped outwardly and the connecting ring is received in the looped free ends of the spring elements.

11. A valve assembly as defined in claim 2, wherein the connecting ring is comprised of a ring having a rectangular cross-section with a smaller radial dimension as compared with its axial dimension and being attached to the middle part of each spring element at which the spring element is bent into a substantially U-shaped configuration.

12. A valve assembly as defined in claim 2, wherein the connecting ring is comprised of a pair of rings each having a triangular cross-section and the spring elements are attached to the bottom sides of the rings at the external side surfaces of the free ends of the spring elements.

13. A valve assembly as defined in claim 2, wherein the connecting ring is comprised of a ring having a rectangular cross-section with a smaller radial dimension as compared to its axial dimension and being attached to the external end surface of the middle part of the spring elements at which the spring elements are bent into the U-shaped configuration.

14. A valve assembly as defined in claim 2, wherein the surfaces of the valve assembly and the valve seat retainer acting on the annular composite spring are each provided with an annular shoulder so that the transmission of force between the annular composite spring and the end surfaces of the valve casing and the valve seat retainer may occur between the free end portions of the spring elements and the shoulders of the valve housing and the valve seat retainer.

15. A valve assembly as defined in claim 2, wherein the spring element is comprised of a plurality of U-shaped wire members arranged in parallel relation and looped at their free ends and the connecting ring is comprised of a pair of wire rings which are passed through the looped free ends of the spring elements.

16. A valve assembly as defined in claim 2, wherein the spring element is comprised of a wire spring which is looped at its both ends in planes which are perpendicular to the circumferential direction of the valve casing and is bent at its middle part in a substantially U-shape in planes which are substantially parallel to the planes of the loops at the free ends of the spring elements.

17. A valve assembly as defined in claim 16, wherein the middle part of the spring member is bent in a substantially U-shape after forming loops at the bent portions.

* * * * *